(12) United States Patent  (10) Patent No.: US 8,744,144 B2
Ishiyama et al.  (45) Date of Patent: Jun. 3, 2014

(54) FEATURE POINT GENERATION SYSTEM, FEATURE POINT GENERATION METHOD, AND FEATURE POINT GENERATION PROGRAM

(75) Inventors: Rui Ishiyama, Tokyo (JP); Hidekata Hontani, Nagoya (JP); Fumihiko Sakaue, Nagoya (JP)

(73) Assignee: NEC Corporation, Tokyo (JP)

( * ) Notice: Subject to any disclaimer, the term of this patent is extended or adjusted under 35 U.S.C. 154(b) by 339 days.

(21) Appl. No.: 13/256,128

(22) PCT Filed: Mar. 12, 2010

(86) PCT No.: PCT/JP2010/054254
§ 371 (c)(1),
(2), (4) Date: Sep. 12, 2011

(87) PCT Pub. No.: WO2010/104181
PCT Pub. Date: Sep. 16, 2010

(65) Prior Publication Data
US 2012/0002867 A1 Jan. 5, 2012

(30) Foreign Application Priority Data
Mar. 13, 2009 (JP) ................................. 2009-061934

(51) Int. Cl.
*G06K 9/00* (2006.01)
*G06K 9/46* (2006.01)
(52) U.S. Cl.
USPC ........................... 382/118; 382/190; 382/154
(58) Field of Classification Search
USPC ......................................... 382/118, 190, 154
See application file for complete search history.

(56) References Cited

U.S. PATENT DOCUMENTS 7,773,798 B2 * 8/2010 Toyama et al. ............... 382/154
8,259,102 B2 * 9/2012 Lim et al. ...................... 345/419
(Continued)

FOREIGN PATENT DOCUMENTS

JP  2001-273496 A  10/2001
JP  2003-141564 A  5/2003
(Continued)

OTHER PUBLICATIONS

Hironobu Fujiyoshi, Gradient-Based Feature Extraction SIFT and HOG, Information Processing Society of Japan CVIM 160, 2007, pp. 221-224.
Joshua Cates et al., Entropy-Based Particle Systems for Shape Correspondence, Proceedings of the MICCAI, 2006, pp. 1-10.
(Continued)

*Primary Examiner* — Utpal Shah
(74) *Attorney, Agent, or Firm* — Foley & Lardner LLP

(57) ABSTRACT

A feature point generation system capable of generating a feature point that satisfies a preferred condition from a three-dimensional shape model is provided. Image group generation means 31 generates a plurality of images obtained by varying conditions with respect to the three-dimensional shape model. Evaluation means 33 calculates a first evaluation value that decreases steadily as a feature point group is distributed more uniformly on the three-dimensional shape model and a second evaluation value that decreases steadily as extraction of a feature point in an image corresponding to a feature point on the three-dimensional shape model becomes easier, and calculates an evaluation value relating to a designated feature point group as a weighted sum of the respective evaluation values. Feature point arrangement means 32 arranges the feature point group on the three-dimensional shape model so that the evaluation value calculated by the evaluation means 33 is minimized.

14 Claims, 10 Drawing Sheets

(56) References Cited

U.S. PATENT DOCUMENTS

| | | | |
|---|---|---|---|
| 2006/0092292 A1* | 5/2006 | Matsuoka et al. | 348/231.99 |
| 2007/0183665 A1* | 8/2007 | Yuasa et al. | 382/195 |
| 2008/0187175 A1* | 8/2008 | Kim et al. | 382/103 |

FOREIGN PATENT DOCUMENTS

| | | |
|---|---|---|
| JP | 2006-115406 A | 4/2006 |
| JP | 2007-102412 A | 4/2007 |
| JP | 2008-204200 A | 9/2008 |
| JP | 2008-225971 A | 9/2008 |

OTHER PUBLICATIONS

Toshinori Hosoi et al., Face Detection Based on Generalized LVQ, Technical Report of IEICE, PRMU, vol. 102, No. 651, 2003, pp. 47-52.

* cited by examiner

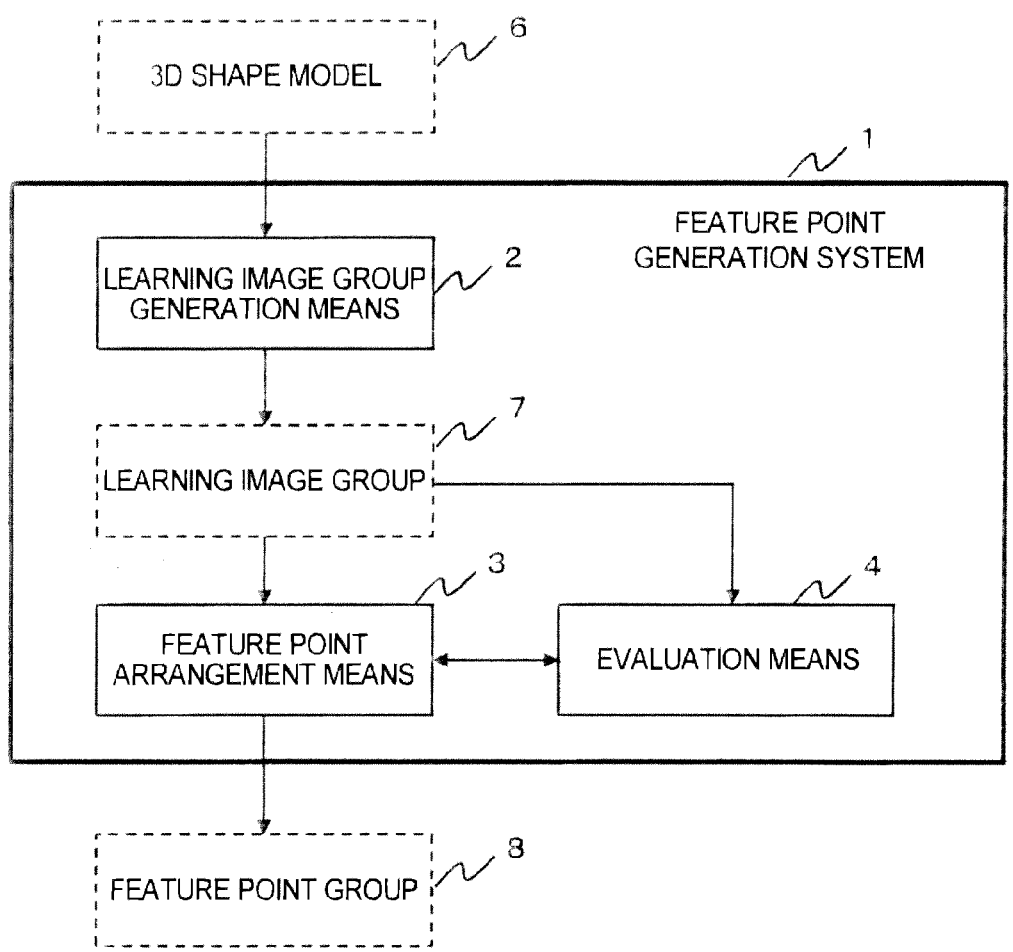

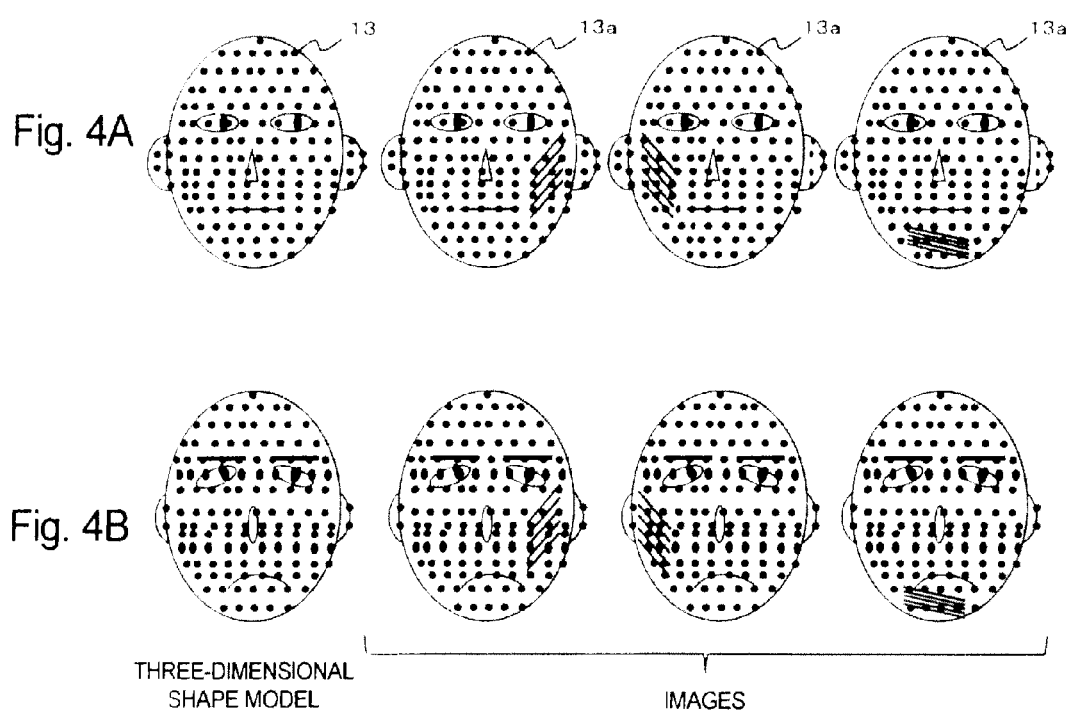

FEATURE POINT GENERATION SYSTEM, FEATURE POINT GENERATION METHOD, AND FEATURE POINT GENERATION PROGRAM

This application is the National Phase of PCT/2010/054254, filed Mar. 12, 2010, which claims priority to Japanese Application No. 2009-061934, filed Mar. 13, 2009, the disclosures of which are hereby incorporated by reference in their entirety.

The present invention relates to a feature point generation system, a feature point generation method, and a feature point generation program for generating a feature point from a three-dimensional shape model.

BACKGROUND

Various techniques have been proposed for estimating an orientation (to be referred to hereafter as an attitude) of an individual (a human face, for example) and recognizing the individual from an image of the individual.

Procedures such as the following may be executed as typical means for estimating the attitude of an individual such as a face and recognizing the individual using a feature point.

(1) A database of a three-dimensional shape model (to be referred to hereafter as a 3D shape model) of an object serving as a recognition subject is constructed. In many cases, a three-dimensional shape is measured using a three-dimensional measurement apparatus (a 3D scanner), and a database of a 3D shape model obtained as a result is constructed.

(2) A specific site of an object to be employed as a feature point for use during recognition is determined as a feature point on the 3D shape model.

(3) A feature point extractor for extracting respective feature points from an image is constructed. In other words, learning is performed in the feature point extractor. When a certain pattern is input into the feature point extractor, the feature point extractor generates internal data for determining whether or not the pattern includes a feature point from feature points and non-feature points known in advance. Generation of this type of internal data is known as learning.

(4) The feature point extractor is used to extract a feature point from an image on which a recognition task such as attitude estimation or individual recognition is to be performed. The recognition task is then performed using a correspondence relationship between a position of the feature point extracted from the image and a position of the feature point on the 3D shape model.

Non-Patent Document 2, for example, describes a method of generating a feature point on the basis of entropy as a technique that can be used in procedure (2). A process of determining a feature point from a state in which a feature point is not determined will be referred to as feature point generation.

Non-Patent Document 1, for example, describes a technique of using a SIFT (Scale-Invariant Feature Transform) algorithm to extract a feature point required to determine a corresponding point between images as a technique for constructing a feature point extractor that can be used in procedure (3). The SIFT algorithm makes it possible to detect a mass through multi-resolution analysis and associate images using a grayscale histogram.

As another technique for constructing a feature point extractor, mechanical learning may be performed in advance in relation to an image pattern to be extracted as a feature point, whereupon a recognition determination is performed on the pattern using the learning result. Non-Patent Document 3 describes the use of GLVQ (Generalized Learning Vector Quantization) in the learning and the determination. In Non-Patent Document 3, pattern detection is performed on a face, but by switching the pattern from the face to a feature point periphery part, a feature point can be detected. An SVM (Support Vector Machine) is also known as mechanical learning means.

The feature points generated by the techniques described in Non-Patent Documents 1 and 2 may be used in the facial attitude estimation and face recognition operations described above and so on, for example.

Non-Patent Document 1: Hironobu FUJIYOSHI, "Gradient-Based Feature Extraction "SIFT and HOG"", Research Paper of Information Processing Society of Japan CVIM 160, pp. 211-224, 2007

Non-Patent Document 2: Joshua Cates, Miriah Meyer, P. Thomas Fletcher, Ross Whitaker, "Entropy-Based Particle Systems for Shape Correspondence", Proceedings of the MICCAI, 2006

Non-Patent Document 3: Toshinori HOSOI, Tetsuaki SUZUKI, Atsushi SATO, "Face Detection using Generalized Learning Vector Quantization", Technical Report of IEICE. PRMU, Vol. 102, No. 651 (20030213), pp. 47-52

The inventor of the present invention, having investigated requirements to be satisfied by a feature point for use in various types of processing such as attitude estimation and individual recognition, found that the feature point should satisfy the following three requirements.

A first requirement (to be referred to hereafter as a requirement A) is that a feature point extractor capable of extracting a feature point position from a recognition subject image reliably even when the lighting and attitude of the image change can be constructed. More specifically, the requirement A is that when a feature point and a point other than the feature point are input into the feature point extractor and then a certain pattern is input, the feature point extractor can be caused to learn internal data for determining whether or not the pattern includes the feature point. For example, a similar image pattern is obtained in all positions of a cheek region, and therefore, when a single point on the cheek is set as the feature point, a point in a different position of the cheek to the feature point has a similar image pattern, making it difficult for the feature point extractor to extract the feature point. Hence, it may be said that a cheek point does not satisfy the requirement A.

A second requirement (to be referred to hereafter as a requirement B) is that the feature points of different individuals correspond. For example, when an eye corner point is set as the feature point, the eye corner point of a person X corresponds to the eye corner point of a person Y. Hence, the eye corner point satisfies the requirement B. The requirement B may be further divided into two requirements. One is that when all 3D shape models are disposed in overlapping fashion on an identical coordinate system, the feature points are positioned close to each other on the 3D shape model. This requirement will be referred to as a requirement B1. Another is that local region patterns (local patterns) on the periphery of the feature point, which are cut out from images and include the feature point, are similar between the images. This requirement will be referred to as a requirement B2. To describe the eye corner as an example, when the 3D shape models of the persons X and Y are overlapped, the eye corner points are close to each other, and therefore the requirement B1 is satisfied. Further, when the eye corner point and the periphery thereof are cut out from facial images of different people, the cut out parts resemble each other, and therefore the eye corner point also satisfies the requirement B2.

A third requirement (to be referred to hereafter as a requirement C) is that the feature point covers points that are important to the recognition task such that by using the feature point, a sufficiently high recognition performance can be realized. As an example of this condition, the requirement C may be said to be satisfied when the feature point is extracted uniformly from the entire 3D shape model rather than being concentrated in a part of the 3D shape model.

First means and second means described below may also be employed as means for generating a feature point on a 3D shape model. The first means is a method of extracting feature points using a typical feature point extractor and selecting a feature point that satisfies the requirements A to C from the extracted feature points. A feature point extractor that determines whether or not the feature point corresponds to a typical pattern such as a corner (an angle), for example, may be used as the typical feature point extractor.

Further, a feature point extractor employing the SIFT algorithm may be applied to the first means. For example, respective images obtained by variously changing the lighting condition of a 3D shape model are prepared, and using the feature point extractor employing the SIFT algorithm, feature point extraction and feature amount calculation are performed on the respective images. A feature point that satisfies the requirements A to C may then be selected from the extracted feature points. To select a feature point that satisfies the requirement A, for example, respective images obtained by varying the lighting on respective individuals (individual faces, for example) are prepared, and using the feature point extractor employing the SIFT algorithm, feature point extraction and feature amount calculation are performed on the respective images. Processing is then performed on each individual to associate feature points having close feature amounts with each other, calculate an average of the positions of the associated feature points within the image, and determine a deviation of the individual feature points from the average position. A feature point that satisfies the requirement A is obtained by selecting a feature point having a small positional deviation from the average with regard to a certain single individual. Further, when the average position of the associated feature points is determined for each individual, an average of the average positions of the respective individuals is determined, and a feature point that satisfies the requirement B is obtained by selecting a feature point in which a deviation between this average (i.e. an inter-individual average) and the average position between the images of the respective individuals is small. A feature point that satisfies the requirements A to C is then obtained by selecting a combination of feature points that are distributed uniformly over the entire 3D shape model from the feature points satisfying the requirements A and B.

A method of selecting a feature point that satisfies a desired condition in advance, causing the feature point extractor to perform specialized learning on the feature point, and then performing feature point extraction using the feature point extractor may be cited as the second means for generating a feature point on a 3D shape model. When selecting the feature point that satisfies the desired condition, a method of extracting the feature point on the basis of entropy, as described in Non-Patent Document 2, may be used. In the method described in Non-Patent Document 2, a feature point is selected from the entire 3D shape model. Further, feature points existing in similar positions on different individuals are selected. In other words, feature points that satisfy the requirements B1 and C are extracted. A plurality of local patterns of these feature points and a plurality of local patterns of points that do not correspond to the feature points are then input into the feature point extractor, whereupon the feature point extractor is caused to perform learning such that thereafter, the feature point extractor can extract similar feature points. The GLVQ and SVM described in Non-Patent Document 3 may be used during construction (learning) of the feature point extractor.

When a feature point is generated using the first means, first, feature points are extracted by a certain feature point extractor, whereupon a feature point that satisfies the requirements A to C is selected therefrom. Hence, with the first means, the generated feature points are limited to feature points that can be extracted favorably by the feature point extractor prepared in advance. It cannot therefore be said that the obtained feature point is the most suitable feature point for performing recognition. For example, even when a feature point that satisfies the requirements A to C is selected from the feature points extracted by the feature point extractor employing the SIFT algorithm, a more important feature point for recognition that could not be extracted using the SIFT feature point extractor may exist. It is therefore impossible to clarify whether or not the obtained feature point is the optimum feature point for obtaining a high recognition performance.

When a method of extracting a feature point on the basis of entropy (the method described in Non-Patent Document 2) is applied to the second means, a feature point that exists in similar positions on different individuals and is obtained uniformly from the entire 3D shape model is extracted. The feature point extractor is then caused to perform learning for generating this type of feature point. Hence, a feature point that satisfies the requirements B1 and C can be generated. However, the ease of the learning performed by the feature point extractor (requirement A) and the similarity of the local patterns among the different individuals (requirement B2) are not taken into account, and therefore a feature point that leads to deterioration of the feature point extraction precision is generated. This type of feature point is ineffective during recognition, and therefore the effectiveness of the generated feature point during recognition cannot be said to be high.

SUMMARY

It is therefore an object of the present invention to provide a feature point generation system, a feature point generation method, and a feature point generation program capable of generating a feature point that satisfies favorable conditions (conditions for increasing effectiveness in order to improve a recognition performance) automatically from a three-dimensional shape model.

A feature point generation system according to the present invention includes: image group generation means for generating a plurality of images obtained by varying conditions with respect to a three-dimensional shape model; evaluation means for calculating a first evaluation value that decreases steadily as a feature point group is distributed more uniformly on the three-dimensional shape model and a second evaluation value that decreases steadily as extraction of a feature point in an image corresponding to a feature point on the three-dimensional shape model becomes easier, and calculating an evaluation value relating to a designated feature point group as a weighted sum of the respective evaluation values; and feature point arrangement means for arranging the feature point group on the three-dimensional shape model so that the evaluation value calculated by the evaluation means is minimized.

A feature point generation method according to the present invention includes: generating a plurality of images obtained by varying conditions with respect to a three-dimensional shape model; calculating a first evaluation value that decreases steadily as a feature point group is distributed more uniformly on the three-dimensional shape model and a second evaluation value that decreases steadily as extraction of a feature point in an image corresponding to a feature point on the three-dimensional shape model becomes easier, and calculating an evaluation value relating to a designated feature point group as a weighted sum of the respective evaluation values; and arranging the feature point group on the three-dimensional shape model so that the evaluation value relating to the designated feature point group is minimized.

A feature point generation program according to the present invention causes a computer to execute: image group generation processing for generating a plurality of images obtained by varying conditions with respect to a three-dimensional shape model; evaluation processing for calculating a first evaluation value that decreases steadily as a feature point group is distributed more uniformly on the three-dimensional shape model and a second evaluation value that decreases steadily as extraction of a feature point in an image corresponding to a feature point on the three-dimensional shape model becomes easier, and calculating an evaluation value relating to a designated feature point group as a weighted sum of the respective evaluation values; and feature point arrangement processing for arranging the feature point group on the three-dimensional shape model so that the evaluation value calculated in the evaluation processing is minimized.

According to the present invention, a feature point that satisfies favorable conditions can be generated from a three-dimensional shape model.

DESCRIPTION OF THE DRAWINGS

FIG. 1 is a block diagram showing an example of a feature point generation system according to a first embodiment of the present invention;

FIG. 4 is an illustrative view showing an example of an initial position of a feature point on the 3D shape model and a feature point on a learning image that corresponds to the feature point;

DETAILED DESCRIPTION

Figure 2A:
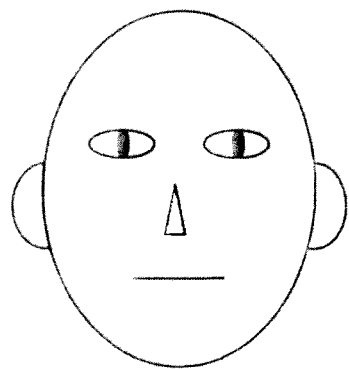
FIG. 2 is an illustrative view showing in pattern form a 3D shape model input into learning image group generation means.

Embodiments of the present invention will be described below with reference to the drawings.

First Embodiment

FIG. 1 is a block diagram showing an example of a feature point generation system according to a first embodiment of the present invention. A feature point generation system 1 according to the first embodiment includes learning image group generation means 2, feature point arrangement means 3, and evaluation means 4.

A 3D shape model (three-dimensional shape model) 6 is input into the learning image group generation means 2, and the learning image group generation means 2 generates a plurality of images (two-dimensional images) as CG (Computer Graphics) images from the input 3D shape model 6. Here, a case in which a 3D shape model of a human face is input into the learning image group generation means 2 will be described as an example. Further, it is assumed that texture is applied to the 3D shape model. The learning image group generation means 2 generates a plurality of images by variously changing conditions relating to the input 3D shape model. The learning image group generation means 2 sets various lighting conditions (lighting positions) and attitudes of the 3D shape model as the conditions, and generates images on the basis of these conditions. The resulting two-dimensional image will be referred to hereafter as a learning image. Further, 3D shape models created in relation to a plurality of individuals are input into the learning image group generation means 2. FIG. 2 shows two 3D shape models, but the number of 3D shape models input into the learning image group generation means 2 is not limited to two.

Figure 2B:
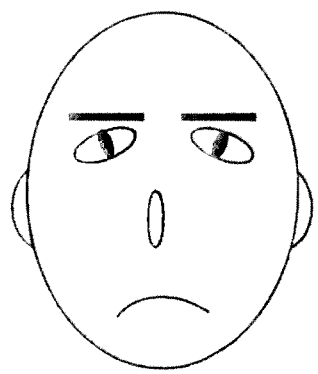
Figure 3A:
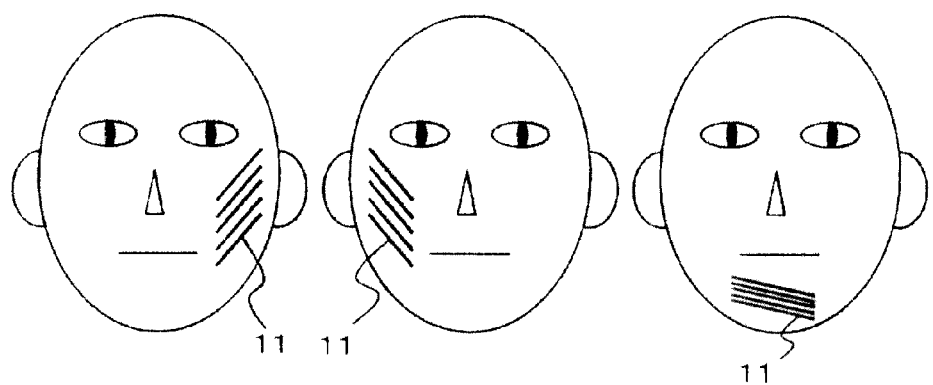
FIG. 3 is an illustrative view showing an example of a generated image.
Figure 3B:
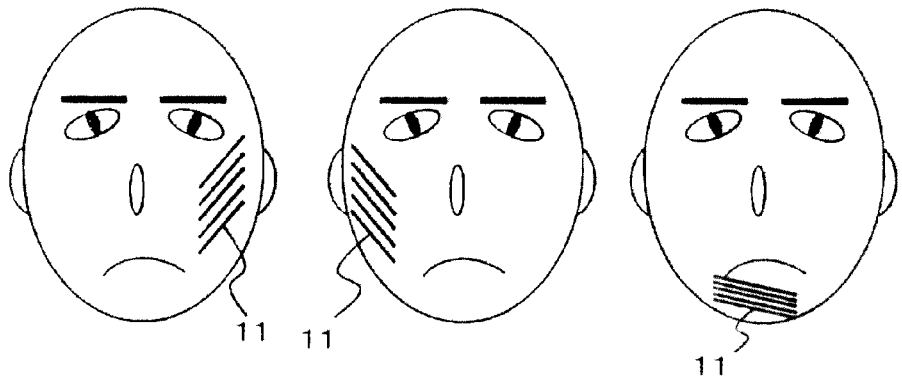

FIG. 2 is an illustrative view showing in pattern form the 3D shape models input into the learning image group generation means 2. FIG. 2 shows the 3D models in two-dimensional pattern form. FIGS. 2A and 2B respectively show 3D shape models of different human faces. When 3D shape models of a plurality of individuals (a plurality of people), such as those shown in FIGS. 2A and 2B, are input into the learning image group generation means 2, learning images obtained by variously changing the lighting position and the attitude of each individual are generated. FIG. 3 is an illustrative view showing examples of the generated learning images. FIG. 3A shows an example of a plurality of learning images generated from the 3D shape model shown in FIG. 2A, and FIG. 3B shows an example of a plurality of learning images generated from the 3D shape model shown in FIG. 2B. FIG. 3 shows a plurality of images obtained by variously changing the lighting position, but the attitude of the 3D shape models may be changed instead. By varying the lighting position relative to the 3D shape model, learning images including a shadow 11 in a location corresponding to the lighting position can be obtained (see FIG. 3). FIG. 3 shows three learning images for each individual, but the number of learning images generated by the learning image group generation means 2 is not limited to three. The learning image group generation means 2 inputs the 3D shape models and a generated learning image group 7 into the feature point arrangement means 3 and the evaluation means 4.

The feature point arrangement means 3 determines an initial position of a feature point group on a 3D shape model input into the feature point generation system 1. The learning images are generated as CG images from the 3D shape model, and therefore, by specifying a feature point on the 3D shape model, a feature point on the learning image that corresponds to the feature point on the 3D shape model can be determined. For example, when a feature point group including a feature point 13 or the like on a 3D shape model shown in FIG. 4 is set as the initial position, corresponding feature points 13a and so on can be determined on the respective learning images. The feature point arrangement means 3 also determines respective feature points on the learning images that correspond to the respective feature points on the 3D shape model.

FIG. 4A shows an example of the initial position of a feature point on the 3D shape model shown in FIG. 2A and feature points on learning images corresponding to this feature point. Similarly, FIG. 4B shows an example of the initial position of a feature point on the 3D shape model shown in FIG. 2B and feature points on learning images corresponding to this feature point. As will be described below, the evaluation means 4 calculates an evaluation value indicating a degree to which a feature point group designated by the feature point arrangement means 3 satisfies the requirements A to C. This evaluation value is set as Q. The evaluation value Q takes a steadily smaller value as the feature point group satisfies the requirements A to C. The feature point arrangement means 3 moves the position of the feature point group from the initial position in order to minimize the evaluation value Q. By repeatedly performing processing for having the feature point arrangement means 3 move the feature point group and having the evaluation means 4 calculate the evaluation value Q for the feature point group, a feature point group with which the minimum evaluation value Q reaches a minimum is determined, and this feature point group is output as an optimum feature point group 8 (see FIG. 1).

When a feature point group is designated on the 3D shape model of each individual, the evaluation means 4 calculates the evaluation value Q indicating the degree to which the feature point group satisfies the requirements A to C. The evaluation means 4 determines the evaluation value Q with respect to the feature point group designated by the feature point arrangement means 3 using a following Equation (1).

[Numeral 1]

$$Q = \xi H_c[P] - \eta \sum_{k=1}^{M} H_u[P^k] - \alpha \sum_{i,k} D(P_i^k) - \beta \sum_{i} A(P_i) \quad \text{Equation (1)}$$

A method of calculating first to fourth terms on the right side of Equation (1) will now be described.

Hc [P] in the first term on the right side of Equation (1) represents entropy, indicating positional coincidence between the 3D shape models of the individuals. Hence, the first term corresponds to the requirement B1. To calculate the first term, a calculation is performed using coordinates of the feature point. Assuming that a number of people is M and a focus person is k, when an $i^{th}$ feature point on one three-dimensional shape model of the $k^{th}$ person is set as Pi, the coordinates of the feature point Pi are expressed as xk, i. Further, an arrangement of coordinates of the feature points on the three-dimensional shape model is set as zk, and zk is (xk, 1T, xk, 2T, . . . , xk, NT) T, where N is the number of feature points in the three-dimensional shape model. When a dimension of the coordinates is set as d, zk is an Nd-dimensional vector. When the respective feature points Pi are arranged in proximal positions on the respective three-dimensional shape models of the people, a dispersion of a distribution of zk (k=1, 2, . . . , M) in an Nd-dimensional space decreases. When the distribution of {zk} is approximated by a normal distribution and a covariance thereof is expressed by Σ, the entropy thereof can be calculated using a following Equation (2). The evaluation means 4 may therefore calculate Hc [P] in the first term on the right side of Equation (1) using the following Equation (2). Note that λj is an eigenvalue of Σ.

[Numeral 2]

$$H_c[P] \approx \frac{1}{2}\log|\Sigma| = \frac{1}{2}\sum_{j=1}^{Nd} \lambda_j \quad \text{Equation (2)}$$

The evaluation means 4 calculates the first term on the right side of Equation (1) by multiplying the calculated Hc[P] by ξ. ξ is a weighting coefficient of the first term. By determining ξ in advance in accordance with the weighting of the first term, ξ=0 may be set if the first term is not to be taken into account.

Calculation of the second term (including the "−" symbol) on the right side of Equation (1) will now be described. The second term quantifies a uniformity of the distribution of the feature point group by entropy, and corresponds to the requirement C. −Hu [Pk] is determined respectively for a first person to an $M^{th}$ person, and a value obtained by calculating the sum total thereof is used as the second term on the right side of Equation (1). Here, [Pk] is the feature point group of the focus person, and Hu [Pk] is the entropy thereof.

When N point groups {Pi} distributed on a curved surface S are provided, {Pi} is considered as a point group generated in accordance with a probability density distribution p (x) (x∈S) defined on S. At this time, the uniformity of the distribution of the point group {Pi} can be defined by the entropy Hu [P]=−∫Sp (x) logp (x) dx of p (x) on S. Here, when the three-dimensional face model can be sampled sufficiently using {Pi}, Hu [P] can be approximated by −(1/N)Σilogp (xi), where xi denotes the position of the feature point Pi. In order to calculate Hu [P] from this equation, p (xi) must be estimated. A Parzen estimation using a Gaussian function G (x, σ) as a window function is employed for the estimation. At this time, a following Equation (3) is obtained.

[Numeral 3]

$$p(x_i) \approx \frac{1}{N(N-1)}\sum_{j \neq i}^{N} G(x_i - x_j, \sigma) \quad \text{Equation (3)}$$

Accordingly, −Hu [P] can be calculated as shown in a following Equation (4).

[Numeral 4]

$$-H_u[P] = \frac{1}{N}\sum_{i} \log \frac{1}{N(N-1)}\sum_{j \neq i} G(x_i - x_j, \sigma) \quad \text{Equation (4)}$$

The evaluation means 4 may calculate the second term on the right side of Equation (1) by determining −Hu [Pk] through the calculation of Equation (4) in relation to each of the M people, calculating a sum total thereof, and multiplying the sum total by η, where η is a weighting coefficient of the second term. By determining η in advance in accordance with the weighting of the second term, η=0 may be set if the second term is not to be taken into account.

Calculation of the third term (including the "−" symbol) on the right side of Equation (1) will now be described. The third term expresses the symmetry of the local pattern, and the value of the third term decreases steadily as the symmetry of the local pattern increases. In other words, the third term corresponds to the requirement A, and the value of the third term decreases steadily as the degree to which the feature point group satisfies the requirement A increases.

Figure 5A:
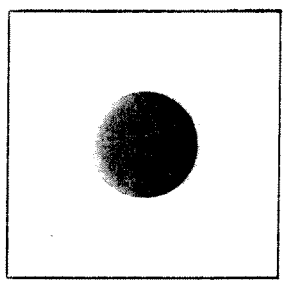
FIG. 5 is an illustrative view showing examples of symmetry.
Figure 5B:
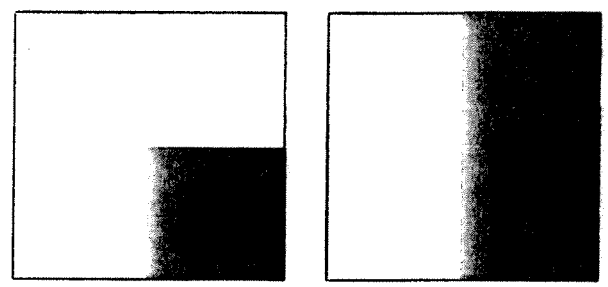

The local pattern is an image of a local region in the learning image located on the periphery of the feature point and including the feature point. A local pattern that includes an edge, a corner, or a local maximum point as the feature point exhibits rotational symmetry and scale symmetry locally. Here, symmetry means invariance of an object relative to a specific transformation. For example, left-right symmetry is invariance of an object relative to a left-right inversion transformation. FIG. 5 is an illustrative view showing examples of symmetry. FIG. 5A shows a local pattern on the periphery of a local maximum point of a pixel value, which does not change relative to rotational transformation and therefore exhibits rotational symmetry. FIG. 5B shows corner and edge patterns that exhibit invariant scale symmetry relative to expansion and contraction.

A local pattern is represented by I(u, v). An origin of a local coordinate system (u, v) is set in the center of the local region. The Euclidean coordinate system (u, v) is transformed into (log-) polar coordinates (r, θ). Further, it is assumed that I(u, v) can be subjected to variable separation. Here, a following Equation (5) is established.

$$I(u,v)=f(r)g(\theta) \quad \text{Equation (5)}$$

When the local pattern I(u, v) is rotationally symmetrical, I(u, v) does not change with respect to variation in θ, and therefore a following Equation (6) is satisfied.

$$I(u,v)=f(r)\Theta 0 \quad \text{Equation (6)}$$

Note that Θ 0 is a constant. When I(u, v) exhibits scale symmetry, on the other hand, I(u, v) does not change with respect to variation in a radius vector r, and therefore a following Equation (7) is satisfied. Here, R0 in Equation (7) is a constant.

$$I(u,v)=R0 g(\theta) \quad \text{Equation (7)}$$

When a two-dimensional Fourier coefficient of the polar coordinate expression I (r, θ) of the local pattern is represented by Cmn, Cmn can be determined by calculating a following Equation (8).

[Numeral 5]

$$C_{mn} \equiv \int_0^{2\pi} \int_0^\varepsilon I(r,\theta) \frac{e^{jm\frac{2\pi}{\varepsilon}r} e^{jn\theta}}{r} r\,dr\,d\theta \quad \text{Equation (8)}$$
$$= \int_0^\varepsilon f(r) e^{jm\frac{2\pi}{\varepsilon}r} dr \int_0^{2\pi} g(\theta) e^{jn\theta} d\theta$$

Note that m and n are integers, and ε is a radius of the local region. Further, in the first embodiment, the local region is assumed to be square. In this case, ε denotes a distance from a center of the square local region to a side of the square, and the radius of an incircle serving as the local region. Further, j in Equation (8) is an imaginary unit. Of the Fourier coefficient Cmn, C00 corresponds to an average value of I(r, θ) in the local region, and the size of this value does not affect the ease with which feature points can be extracted. When the local pattern is rotationally symmetrical, all values other than C0n take zero. When the local pattern is scale symmetrical, on the other hand, all values other than Cm0 take zero. Therefore, when Sall is determined as shown in Equation (9), a rotational symmetry Srot and a scale symmetry Sscl of the local pattern can be calculated from Equation (10) and Equation (11) using Sall.

[Numeral 6]

$$S_{all} \equiv \sum_{m=0}^{\infty} \sum_{n=0}^{\infty} |C_{mn}|^2 - |C_{00}|^2 \quad \text{Equation (9)}$$

[Numeral 7]

$$S_{rot} \equiv \frac{\sum_{m=1}^{\infty} |C_{m0}|^2}{S_{all}} \quad \text{Equation (10)}$$

[Numeral 8]

$$S_{scl} = \frac{\sum_{n=1}^{\infty} |C_{02}|^2}{S_{all}} \quad \text{Equation (11)}$$

0≤Srot, Sscl≤1, and Srot and Sscl take a maximum value of 1 only when the local pattern is symmetrical. The evaluation means 4 cuts out the local pattern from the learning image, calculates Srot and Sscl in each position, and determines a two-dimensional vector [Srot, Sscl] T expressing the ease with which feature points can be extracted in relation to all of the points appearing on the image, from among the respective feature points on the 3D shape model. The evaluation means 4 then determines an extraction ease in relation to the image from a length of the vector. This extraction ease may be referred to as a log-polar feature amount. When the extraction ease is set as D (P), the evaluation means 4 can calculate the extraction ease D (P) using a following Equation (12).

[Numeral 9]

$$D(P)=\sqrt{S_{rot}^2(P)+S_{scl}^2(P)} \quad \text{Equation (12)}$$

The evaluation means 4 calculates the third term on the right side of Equation (1) by performing the calculation of the Equation (12) for each feature point of the respective individuals to determine the extraction ease D (P), and multiplying a sum total thereof by −α, where α is a weighting coefficient of the third term. By determining α in advance in accordance with the weighting of the third term, α=0 may be set if the third term is not to be taken into account.

The third term may take a value that decreases steadily as the ease with which a feature point corresponding to the feature point on the three-dimensional shape model can be extracted from the image increases. In the above example, a term calculated as a value that decreases steadily as the symmetry of the local pattern including the feature point of the image is used as the third term.

Calculation of the fourth term (including the "−" symbol) on the right side of Equation (1) will now be described. The fourth term corresponds to the requirement B2. The value of the fourth term decreases steadily as the degree to which the feature point group satisfies the requirement B2 increases. A (Pi) in the fourth term on the right side of Equation (1) is a luminance statistic of a template (a local region in the learning image) of a feature point Pi on each person. The evaluation means 4 may calculate a dispersion as a feature amount of the luminance of the feature point template corresponding to the respective people, for example. Alternatively, the evaluation means 4 may calculate an average value of the inter-person luminance, and calculate a sum total of a difference between an average value thereof and a luminance value of each person as the statistic. Moreover, use of the luminance is merely an example, and feature amount values calculated by applying various feature extraction operators may be used instead. The evaluation means 4 calculates the fourth term on the right side of Equation (1) by multiplying a sum total of the feature amounts calculated for the respective feature points by $-\beta$, where $\beta$ is a weighting coefficient of the fourth term. By determining $\beta$ in advance in accordance with the weighting of the fourth term, $\beta=0$ may be set if the fourth term is not to be taken into account. A term taking a value that decreases steadily as the similarity between local patterns having varying conditions (people in this example) increases may be used as the fourth term. The attitude, the lighting position, and so on may be used as the condition.

Further, as described above, the feature point arrangement means 3 moves the feature point such that the evaluation value Q is reduced. The feature point arrangement means 3 determines a feature point group for minimizing the evaluation value Q using a method of steepest descent. The feature point arrangement means 3 may move each feature point by calculating a following Equation (13).

[Numeral 10]

$$x_i^k \leftarrow x_j^k + \gamma \left[ -\frac{\partial G}{\partial x_j^k} + \frac{\partial E^k}{\partial x_j^k} \right] \quad \text{Equation (13)}$$

$\gamma$ in Equation (13) is a parameter for adjusting a movement amount, which may be determined in advance. Further, E in Equation (13) is a function expressed as shown in a following Equation (14) when a set of coordinates of each point is represented by $z=(x1, x2, \ldots, xN)$.

[Numeral 11]

$$E(z) = \Sigma_i \log \Sigma_{j \neq 1} G(x_i - x_j, \sigma) \quad \text{Equation (14)}$$

A derivative of E (z) with respect to xi is expressed as shown in a following Equation (15). Note that $\Sigma_j \omega_{ij} = 1$.

[Numeral 12]

$$-\frac{\partial E}{\partial x_i} = \frac{1}{\sigma^2} \frac{\sum_{j \neq i}(x_i - x_j) G(x_i - x_j, \sigma)}{\sum_{j \neq i} G(x_i - x_j, \sigma)}$$

$$= \sigma^{-2} \sum_{j \neq i}(x_i - x_j) \omega_{ij} \quad \text{Equation (15)}$$

Further, a sample average relating to zk is expressed as shown in a following Equation (16).

[Numeral 13]

$$\bar{z} = \Sigma_{k=1}^M z^k / M \quad \text{Equation (16)}$$

Further, a deviation yk about the average is expressed as shown in a following Equation (17).

[Numeral 14]

$$y^k = z^k - \bar{z} \quad \text{Equation (17)}$$

Furthermore, an Nd×M matrix obtained by arranging yk in series is expressed as $Y=[y1 \, y2 \ldots yM]$. At this time, $\Sigma=(1/(M-1))YT^T$. Hence, at this time, a following Equation (18) is obtained.

[Numeral 15]

$$-\frac{\partial G}{\partial x_i^k} = Y(Y^T Y + \alpha I)^{-1} \quad \text{Equation (18)}$$

The learning image group generation means 2, feature point arrangement means 3, and evaluation means 4 are realized by a CPU of a computer activated in accordance with a feature point generation program, for example. For example, the CPU may read the feature point generation program stored in a storage device (not shown) of the computer, and the computer may be operated as the learning image group generation means 2, feature point arrangement means 3, and evaluation means 4 in accordance with the program. Alternatively, the learning image group generation means 2, feature point arrangement means 3, and evaluation means 4 may be realized by respective dedicated circuits.

Next, an operation will be described.

Figure 6:
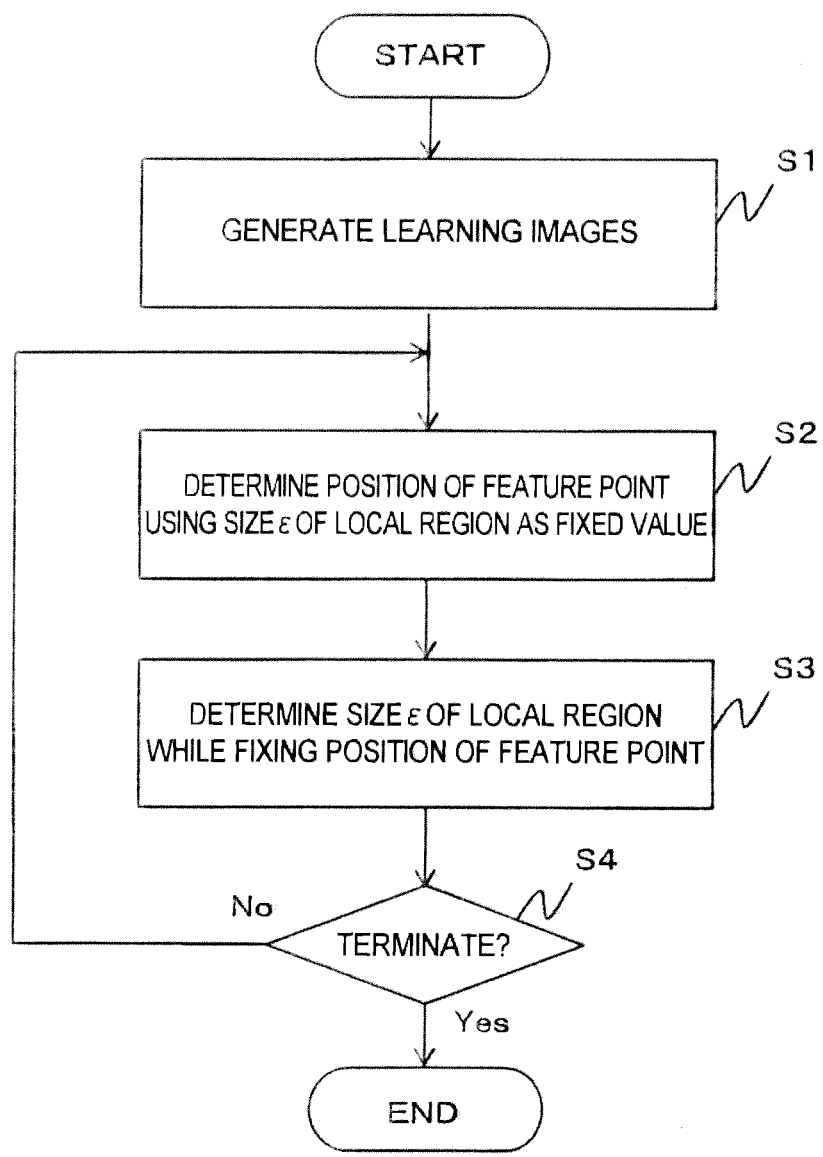
FIG. 6 is a flowchart showing an example of the course of processing according to the first embodiment.

FIG. 6 is a flowchart showing an example of the course of processing according to the first embodiment. When 3D shape models of the faces of respective people are input into the learning image group generation means 2, the learning image group generation means 2 creates learning images for each person by variously changing the lighting position on the 3D shape model and the attitude of the 3D shape model (step S1).

Next, the feature point arrangement means 3 and the evaluation means 4 determine the position of a feature point using the size c of the local region of each feature point (the incircle radius of the local region) as a fixed value (step S2). In the step S2, the feature point arrangement means 3 determines the initial position of the feature point group on each 3D shape model, whereupon the evaluation means 4 calculates an evaluation value for the feature point group. When the feature point arrangement means 3 determines the initial position of the feature point group on the 3D shape model, the position of a feature point group within the learning image that corresponds to the feature point group is also determined. When the position of the feature point is specified, the evaluation means 4 calculates the evaluation value Q of the feature point group specified by the feature point arrangement means 3 using $\epsilon$ of Equation (8) as a fixed value. The feature point arrangement means 3 then moves the feature point group on the 3D shape model so as to minimize the evaluation value Q, whereupon the evaluation means 4 recalculates the evaluation value Q for the feature point group using $\epsilon$ as a fixed value. This processing is performed until the evaluation value Q converges, whereby the position of the feature point group upon convergence of the evaluation value Q is identified.

Next, the evaluation means 4 fixes the position of the feature point group, assuming that a feature point group exists in that position, varies the size $\epsilon$ of the local region, and then recalculates the evaluation value Q of the feature point group. $\epsilon$ at the point where the evaluation value Q reaches a minimum is thus identified (step S3). By varying $\epsilon$, Cmn determined in the calculation of Equation (8) varies, and as a result, the evaluation value Q varies in accordance with $\epsilon$. In the step S3, the evaluation means 4 determines $\epsilon$ at which the evaluation value Q reaches a minimum by varying while keeping the feature point group fixed.

As shown in FIG. 6, the steps S2 and S3 constitute loop processing. Following the step S3, the evaluation means 4 determines whether or not to terminate the loop processing of the steps S2 and S3 (step S4). For example, it may be determined that the loop processing is to be terminated when a difference between the minimum value of the evaluation value Q calculated by varying $\epsilon$ in an immediately preceding step S3 and the minimum value of the evaluation value Q calculated by varying $\epsilon$ in the step S3 previous thereto has reached or fallen below a predetermined value (i.e. Q has converged) (Yes in step S4), and when the difference is greater than the predetermined value (No in step S4), it may be determined that the steps S2 and S3 are to be repeated.

When the step S2 is performed again following the step S4, $\epsilon$ calculated in the immediately preceding step S3 may be used as the fixed value of $\epsilon$. Further, the step S2 may be started using the position of the feature point group determined in the immediately preceding step S2 as the initial position of the feature point group.

When it is determined in the step S4 that the loop processing is to be terminated, the feature point arrangement means 3 outputs the feature point group determined in the immediately preceding step S2 and $\epsilon$ determined in the immediately preceding step S3. In other words, the feature point arrangement means 3 determines the arrangement of the feature points and sets the size of the local patterns to be used to extract the respective feature points at E determined in the immediately preceding step S3.

Note that in FIG. 6, the steps S2 and S3 constitute loop processing. However, the processing may be terminated after performing the steps S2 and S3 once each rather than repeatedly.

According to the present invention, the evaluation value Q is determined through the calculation of Equation (1). The first to fourth items on the right side of Equation (1) correspond respectively to the requirement B1, the requirement C, the requirement A, and the requirement B2 to be satisfied by the feature point, and each term, as well as the evaluation value Q, takes a steadily smaller value as the degree to which the feature point group satisfies the respective requirements increases. The feature point arrangement means 3 moves the feature point group so that the evaluation value Q is minimized, and therefore a feature point group that satisfies the requirements A, B1, B2 and C can be generated.

Further, the first to fourth terms of Equation (1) may be terms in which the weighting coefficient is set at zero. For example, a sum of the second term and the third term may be calculated with $\xi$ and $\beta$ of Equation (1) set at zero. Further, a sum of the second term, third term, and fourth term may be calculated without setting $\beta$ at zero, for example. Furthermore, the sum of the first to fourth terms may be calculated without setting any of the weighting coefficients of the respective terms at zero. In all of these cases, a favorable feature point group taking into account conditions corresponding to the terms in which the weighting coefficient has not been set at zero can be generated.

Further, after determining the position of the feature point in the step S2, the evaluation value Q is calculated by varying the size $\epsilon$ of the local region including the feature point, and $\epsilon$ at which the evaluation value Q is minimized is determined. Accordingly, E satisfying the requirements A, B1, B2, C can also be determined. Moreover, by repeating the steps S2 and S3, the feature point group and $\epsilon$ can be determined even more favorably.

In the case described above, the position of the feature point is determined using $\epsilon$ (the size of the local region) as a fixed value (step S2), whereupon the size of $\epsilon$ is determined by fixing the position of the feature point (step S3). However, the positions of the respective feature points and $\epsilon$ may be determined simultaneously. More specifically, the value of $\epsilon$ may be varied during calculation of the evaluation value Q when the feature point is moved from the initial position of the feature point in order to minimize the evaluation value Q. The feature point position and $\epsilon$ at the point where the evaluation value Q reaches a minimum may thus be determined simultaneously.

Second Embodiment

Figure 7:
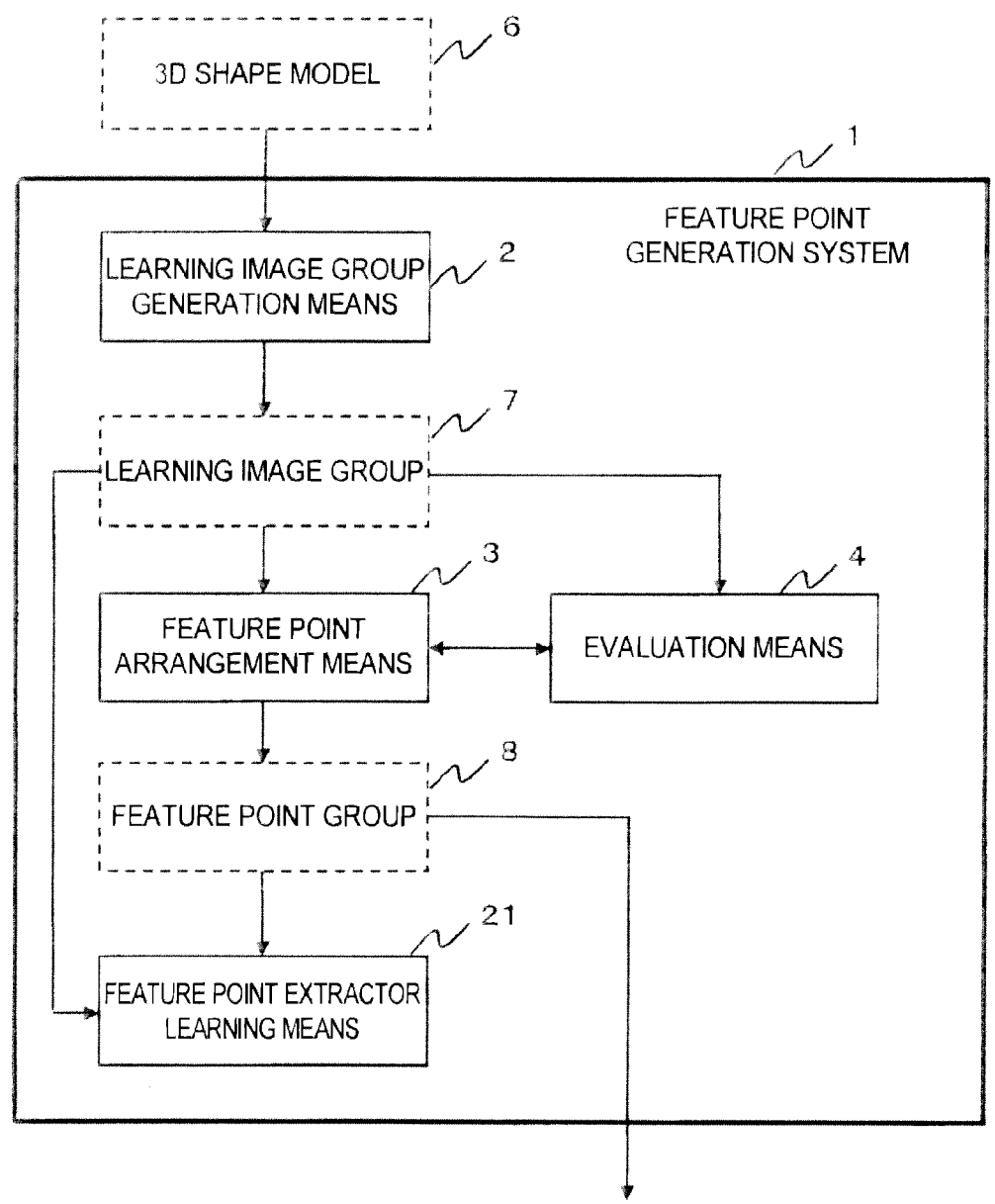
FIG. 7 is a block diagram showing an example of a feature point generation system according to a second embodiment of the present invention.

A feature point generation system according to a second embodiment includes a function for learning internal data of a feature point extractor. FIG. 7 is a block diagram showing an example of the feature point generation system according to the second embodiment. Identical constitutional elements to those of the first embodiment have been allocated identical reference numerals to those shown in FIG. 1, and description thereof has been omitted. The feature point generation system according to the second embodiment includes the learning image group generation means 2, the feature point arrangement means 3, the evaluation means 4, and feature point extractor learning means 21.

Similarly to the first embodiment, the feature point arrangement means 3 outputs a generated feature point group and the radius $\epsilon$ of a local region. The feature point extractor learning means 21 performs learning using the generated feature point group. More specifically, internal data of a feature point extractor for determining whether or not a provided pattern includes a feature point are generated. The feature point extractor learning means 21 may operate as a feature point extractor and use a generated feature point group to perform learning.

The feature point extractor learning means 21 performs learning by referring to a plurality of patterns corresponding to a feature point and a plurality of patterns not corresponding to the feature point. When learning is performed by focusing on a certain feature point, the feature point extractor learning means 21 cuts out a plurality of local patterns centering on a feature point or a point near the feature point and determined in accordance with $\epsilon$ from the learning image as the pattern corresponding to the feature point. Further, the feature point extractor learning means 21 cuts out a plurality of local patterns on the periphery of the feature point but not including the feature point from the learning image as patterns not corresponding to the feature point. The feature point extractor learning means 21 then performs learning using the plurality of patterns corresponding to the feature point and the plurality of patterns not corresponding to the feature point, and generates internal data for determining whether or not a provided pattern includes the feature point. The feature point extractor learning means 21 may perform learning for each feature point in a generated feature point group.

The feature point extractor learning means 21 may confirm the feature point group and $\epsilon$ (after making an affirmative determination in the step S4, for example), and then perform learning using the feature point group and $\epsilon$.

The feature point extractor learning means 21 is realized by a CPU of a computer that is activated in accordance with a feature point generation program, for example, and the CPU may be operated as the feature point extractor learning means 21 and the other means 2 to 4 in accordance with the feature point generation program. Alternatively, the feature point extractor learning means 21 may be provided separately from the other means in the form of a dedicated circuit.

With the second embodiment, similar effects to those of the first embodiment are obtained. Furthermore, learning is performed using the generated feature point group, and therefore, when a certain pattern is provided, it is possible to determine whether or not the pattern includes a feature point that satisfies the requirements A to C.

Third Embodiment

Figure 8:
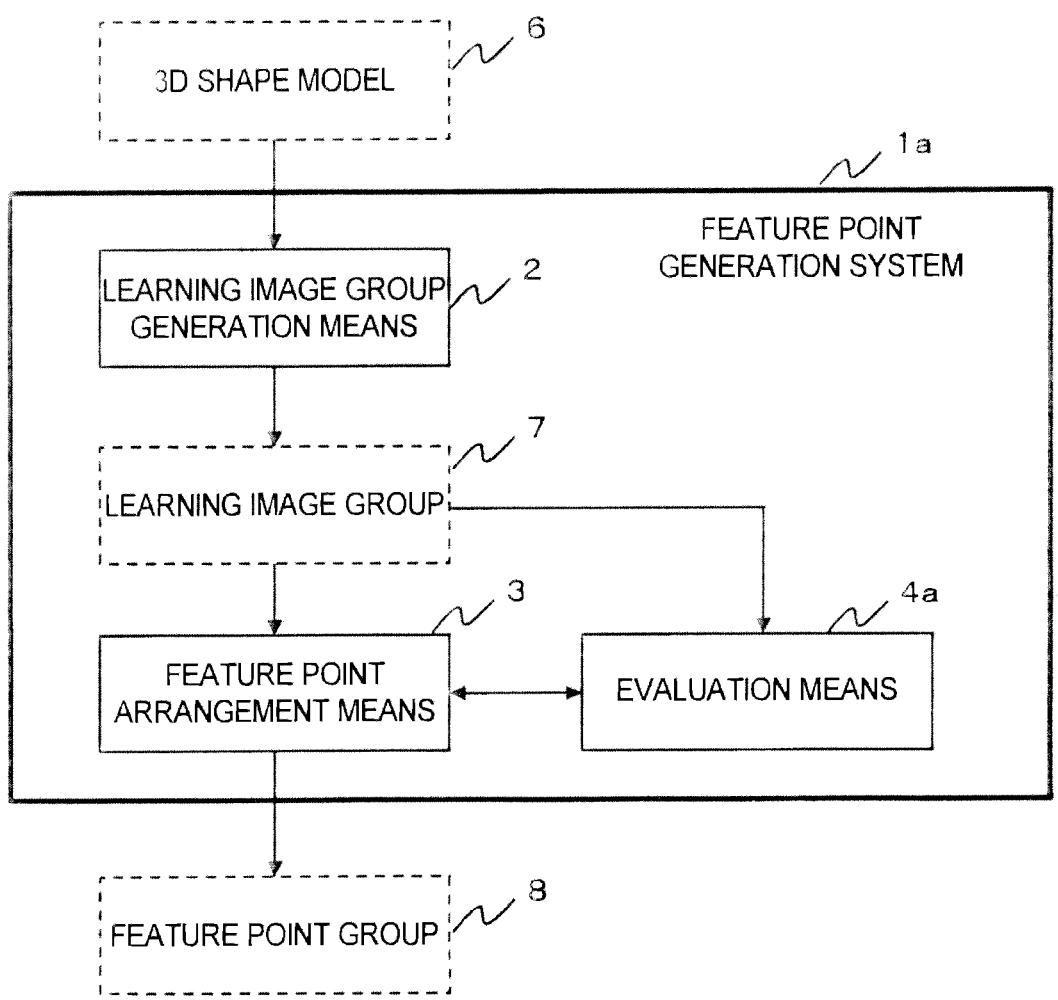
FIG. 8 is a block diagram showing an example of a feature point generation system according to a third embodiment of the present invention.

In the embodiments described above, the local region is described as a square. In a third embodiment, the local region is rectangular, and both the size and an aspect ratio of the rectangle are determined. The aspect ratio is a magnification ratio between a vertical length and a horizontal length of the rectangle serving as the local region. FIG. 8 is a block diagram showing a constitutional example of the third embodiment. Similar constitutional elements to those of the first embodiment have been allocated similar reference numerals to those shown in FIG. 1, and description thereof has been omitted. A feature point generation system 1a according to this embodiment includes the learning image group generation means 2, the feature point arrangement means 3, and evaluation means 4a.

The evaluation means 4a calculate the evaluation value Q, similarly to the evaluation means 4 of the first embodiment. In this embodiment, however, the evaluation means 4a varies the aspect ratio of the local region as well as the size c of the local region so that an evaluation value Q corresponding to the aspect ratio is calculated. When the aspect ratio is set as W, the evaluation means 4a may calculate the evaluation value Q corresponding to W in the following manner. Before performing the integration calculation of Equation (8), the evaluation means 4a transforms the learning image in a horizontal direction to obtain a multiple of 1/W, and then performs the integration calculation of Equation (8) in relation to the transformed learning image. All other points in the course of calculating the evaluation value Q are similar to those of the method for calculating the evaluation value Q according to the first embodiment. For example, when the aspect ratio is 2, the evaluation means 4a reduces the learning image in the horizontal direction to obtain a multiple of ½ before performing the integration calculation of Equation (8). The integration calculation of Equation (8) may then be performed on the reduced learning image. When the evaluation value Q is calculated by transforming the learning image in the horizontal direction to a multiple of 1/W and performing the calculation of Equation (8) on the resulting image in this manner, an evaluation value Q that corresponds to a rectangular local region can be calculated. Equation (8) is the calculation that affects the third term on the right side of Equation (1), and therefore the evaluation means 4a calculates the third term on the right side of Equation (1) in accordance with the aspect ratio.

The evaluation means 4a is realized by a CPU of a computer that is activated in accordance with a feature point generation program, for example, and the CPU may be operated as the evaluation means 4a and the other means 2 and 3 in accordance with the feature point generation program. Alternatively, the evaluation means 4a may be provided separately from the other means in the form of a dedicated circuit.

Figure 9:
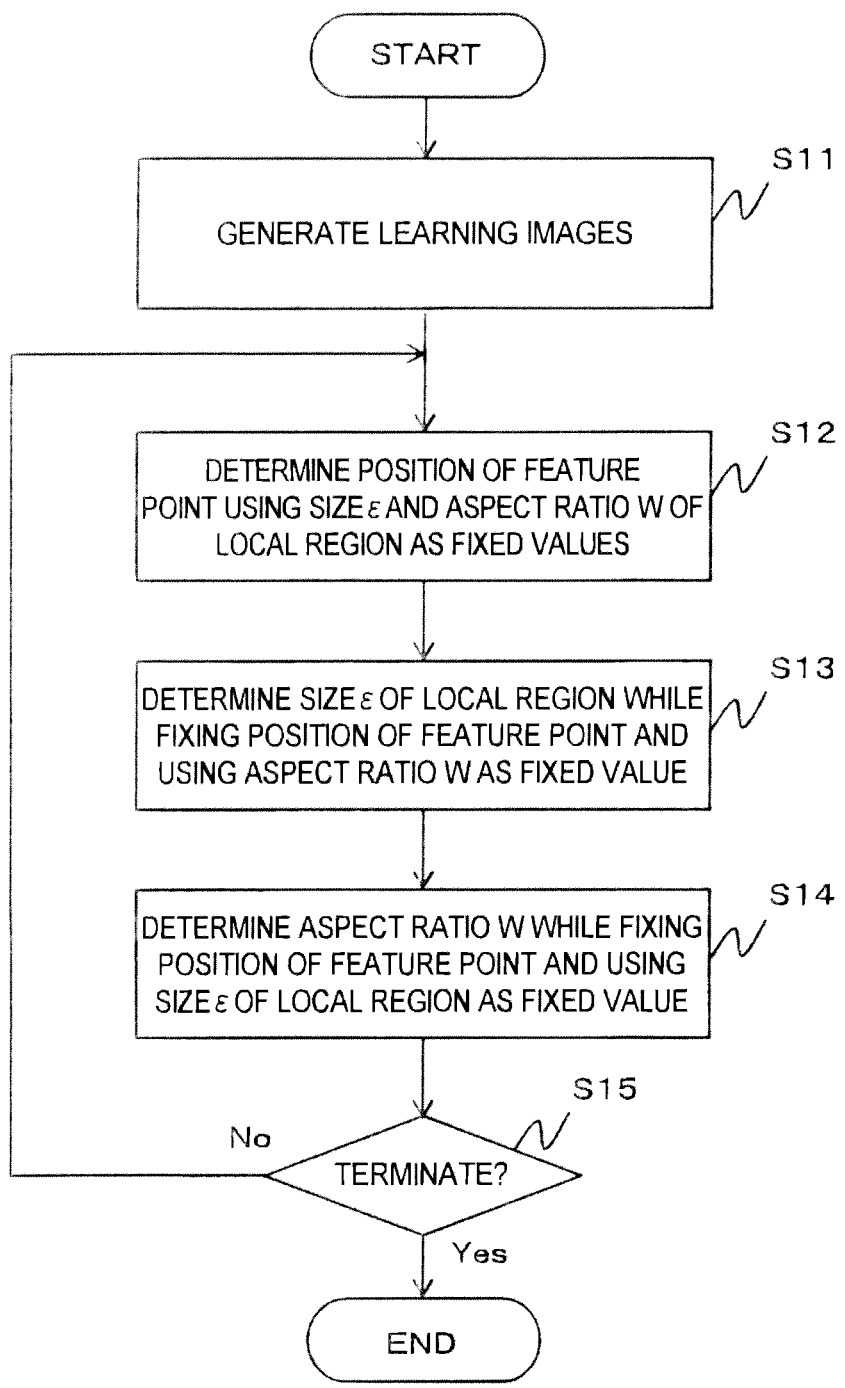
FIG. 9 is a flowchart showing an example of the course of processing according to the third embodiment.

FIG. 9 is a flowchart showing an example of the course of processing according to the third embodiment. When 3D shape models of the faces of respective people are input into the learning image group generation means 2, the learning image group generation means 2 creates learning images for each person by variously changing the lighting position on the 3D shape model and the attitudes of the 3D shape model (step S11).

Next, the feature point arrangement means 3 and the evaluation means 4a determine the position of a feature point using the sizes and the aspect ratio W of the local region of each feature point as fixed values (step S12). Similarly to the step S2 of the first embodiment, the feature point arrangement means 3 determines the initial position of the feature point group on each 3D shape model and the position of a feature point group within the learning image that corresponds to the feature point group. When the position of the feature point is specified, the evaluation means 4a calculates the evaluation value Q. At this time, the evaluation means 4a transforms the learning image in the horizontal direction to obtain a multiple of 1/W before performing the integration calculation of Equation (8). The evaluation means 4a then calculates the third term of Equation (1) by performing the integration calculation of Equation (8) on the transformed learning image using $\epsilon$ of Equation (8) as a fixed value. All other points in the course of calculating the evaluation value Q are similar to those of the step S2 according to the first embodiment. The feature point arrangement means 3 then moves the feature point group on the 3D shape model so as to minimize the evaluation value Q, whereupon the evaluation means 4a recalculates the evaluation value Q for the feature point group using $\epsilon$ as a fixed value. This processing is performed until the evaluation value Q converges, whereby the position of the feature point group upon convergence of the evaluation value Q is identified.

Next, the evaluation means 4a fixes the position of the feature point group, assuming that a feature point group exists in that position, varies the size $\epsilon$ of the local region using the aspect ratio W as a fixed value, and then recalculates the evaluation value Q of the feature point group. The size $\epsilon$ when the evaluation value Q reaches a minimum is thus identified (step S13). At this time, the evaluation means 4a may transform the learning image in the horizontal direction to obtain a multiple of 1/W before performing the integration calculation of Equation (8), and then calculate the evaluation value Q while variously changing $\epsilon$ in relation to the transformed learning image. Apart from transforming the learning image in the horizontal direction to obtain a multiple of 1/W, Equation (8) is calculated in a similar manner to the first embodiment.

Next, the evaluation means 4a varies the aspect ratio, assuming that a feature point group exists in the position determined in the step S12 and that the value of $\epsilon$ determined in the step S13 is fixed, and then recalculates the evaluation value Q of the feature point group. Thus, W at the point where the evaluation value Q reaches a minimum is identified (step S14). Likewise in the step S14, the evaluation means 4a transforms the learning image in the horizontal direction to obtain a multiple of 1/W before performing the integration calculation of Equation (8). At this time, the evaluation means 4a transforms the learning image to various magnifications (1/W) by varying W. The evaluation value Q corresponding to each W is then calculated, whereby W at which the evaluation value Q reaches a minimum is identified.

Following the step S14, the evaluation means 4a determines whether or not to terminate the loop processing of the steps S12 to S14 (step S15). For example, it may be determined that the loop processing is to be terminated when a difference between the minimum value of the evaluation value Q calculated by varying W in an immediately preceding step S14 and the minimum value of the evaluation value Q calculated by varying W in the step S14 previous thereto has reached or fallen below a predetermined value (i.e. Q has converged) (Yes in step S15), and when the difference is greater than the predetermined value (No in step S15), it may be determined that the steps S12 to S14 are to be repeated.

When the step S12 is performed again following the step S15, $\epsilon$ and W calculated in the immediately preceding steps S13, S14 may be used as the fixed values of $\epsilon$ and W. Further, the step S12 may be started using the position of the feature point group determined in the immediately preceding step S12 as the initial position of the feature point group.

When it is determined in the step S15 that the loop processing is to be terminated, the feature point arrangement means 3 outputs the feature point group determined in the immediately preceding step S12, $\epsilon$ determined in the immediately preceding step S13, and W determined in the immediately preceding step S14. In other words, the feature point arrangement means 3 determines the arrangement of the feature points and sets the size of the local patterns to be used to extract the respective feature points at $\epsilon$ determined in the immediately preceding step S13. Further, the feature point arrangement means 3 sets the aspect ratio of the local patterns to be used to extract the respective feature points at W determined in the immediately preceding step S14.

With this embodiment, similar effects to those of the first embodiment can be obtained. Furthermore, the evaluation value Q is calculated taking the aspect ratio W into account, and the aspect ratio W at which the evaluation value Q reaches a minimum is determined. Therefore, when a rectangle is cut out as a local region during attitude estimation, individual authentication, and so on, a favorable aspect ratio that satisfies the requirements A to C can be determined.

Note that in FIG. 9, the steps S12 to S14 constitute loop processing. However, the steps S12 to S14 need not constitute loop processing, and instead the processing may be terminated after performing the steps S12 to S14 once each.

Further, instead of performing the step S13 and the step S14 separately, the evaluation means 4a may identify $\epsilon$ and W at which the evaluation value Q reaches a minimum simultaneously by varying $\epsilon$ and W respectively.

Furthermore, the positions of the respective feature points may be determined at the same time as $\epsilon$ and W. More specifically, when a feature point is moved from the initial position W of the feature point so as to minimize the evaluation value Q, $\epsilon$ and W may be varied while calculating the evaluation value Q. In so doing, the feature point position, $\epsilon$, and W at which the evaluation value Q reaches a minimum can be determined simultaneously.

The feature point generation system according to the third embodiment may include the feature point extractor learning means 21, similarly to the second embodiment.

Figure 10:
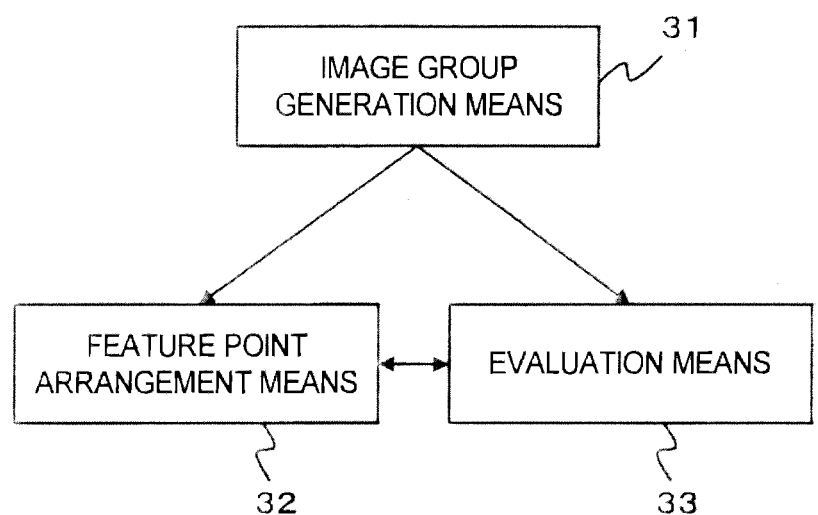
FIG. 10 is a block diagram showing a minimum constitution according to the present invention.

Next, a minimum constitution of the present invention will be described. FIG. 10 is a block diagram showing the minimum constitution of the present invention. The feature point generation system according to the present invention includes image group generation means 31, feature point arrangement means 32, and evaluation means 33.

The image group generation means 31 (the learning image group generation means 2, for example) generates a plurality of images (learning images, for example) by varying conditions (the attitude of an individual, a lighting application method, and so on, for example) with respect to a three-dimensional shape model.

The evaluation means 33 (the evaluation means 4, 4a, for example) calculates a first evaluation value (the second term on the right side of Equation (1), for example) that decreases steadily as the feature point group is distributed more uniformly on the three-dimensional shape model and a second evaluation value (the third term on the right side of Equation (1), for example) that decreases steadily as extraction of a feature point in an image corresponding to the feature point on the three-dimensional shape model becomes easier, and calculates an evaluation value (the evaluation value Q, for example) relating to a designated feature point group as a weighted sum of the respective evaluation values.

The feature point arrangement means 32 (the feature point arrangement means 3, for example) then arranges the feature point group on the three-dimensional shape model so that the evaluation value calculated by the evaluation means 33 is minimized.

With this constitution, a favorable feature point group can be obtained.

Further, the above embodiment discloses a constitution in which the evaluation means 33 uses a value calculated to decrease steadily as the symmetry of the local pattern of the feature point in the image increases as the second evaluation value.

Furthermore, the above embodiment discloses a constitution in which the evaluation means 33 calculates a third evaluation value (the fourth term on the right side of Equation (1), for example), which is calculated as a value that decreases steadily as the similarity of the local pattern of the feature point in the image increases between the respective images obtained under different conditions, and calculates the evaluation value relating to the designated feature point group as a weighted sum of the respective evaluation values.

Moreover, the above embodiment discloses a constitution in which the image group generation means 31 generates images obtained by varying conditions with respect to the three-dimensional shape models of a plurality of individuals, whereupon the evaluation means 33 calculates a fourth evaluation value (the first term on the right side of Equation (1), for example) serving as a value that decreases steadily as the feature points of the respective individuals become closer to each other when the three-dimensional shape models of the individuals are overlapped on an identical coordinate system, and calculates the evaluation value relating to the designated feature point group as a weighted sum of the respective evaluation values.

Further, the above embodiment discloses a constitution in which the evaluation means 33 varies the size of the local pattern of the feature point and calculates a second evaluation value corresponding to the size of the local pattern, whereupon the feature point arrangement means 32 determines both the arrangement of the feature points and the size of the local pattern to be used to extract the respective feature points. With this constitution, the size of the local pattern can also be determined favorably.

Further, the above embodiment discloses a constitution in which the evaluation means 33 calculates the second evaluation value while keeping the size of the local pattern of the feature point constant and calculates the evaluation value relating to the designated feature point group as the sum of the respective evaluation values, the feature point arrangement means 32 moves the feature point group such that the evaluation value calculated by the evaluation means 33 is minimized (executes the step S2, for example), and when the feature point group at which the evaluation value is minimized is determined, the evaluation means 33 varies the size of the local pattern of the feature point while keeping the position of the feature point group fixed, calculates the second evaluation value corresponding to the size of the local pattern, calculates the evaluation value relating to the designated feature point group as the sum of the respective evaluation values, and determines the size of the local pattern at which the calculated evaluation value is minimized (executes the step S3, for example).

Furthermore, the above embodiment discloses a constitution in which, when the size of the local pattern at which the evaluation value is minimized is determined, the evaluation means 33 calculates the second evaluation value while keeping the size of the local pattern of the feature point fixed at the determined size and calculates the evaluation value relating to the designated feature point group as the sum of the respective evaluation values, whereupon the feature point arrangement means 32 moves the feature point group so that the evaluation value calculated by the evaluation means 33 is minimized.

Moreover, the above embodiment discloses a constitution in which the evaluation means 33 (the evaluation means 4a, for example) varies an aspect ratio of the local pattern of the feature point and calculates the second evaluation value corresponding to the aspect ratio of the local pattern, whereupon the feature point arrangement means 32 determines both the arrangement of the feature points and the aspect ratio of the local pattern to be used to extract the respective feature points. With this constitution, the aspect ratio of the local pattern can also be determined favorably.

Furthermore, the above embodiment discloses a constitution including determination data learning means (the feature point extractor learning means 21, for example) that learns determination data (the internal data of the feature point extractor, for example) for determining whether or not corresponds to a feature point from the local pattern including that feature point at which the evaluation value reaches a minimum and a local pattern not including a feature point. With this constitution, when a certain pattern is provided, it can be determined using the determination data whether or not the pattern includes a feature point that satisfies the requirements A to C.

The present invention was described above with reference to embodiments thereof, but the present invention is not limited to the above embodiment, and various modifications that can be understood by a person skilled in the art may be applied to the constitutions and details of the present invention within the scope of the present invention.

A part or all of the above embodiments is described in the following supplementary notes, but is not limited thereto.

(Supplementary Note 1)

A feature point generation system including:

an image group generation unit that generates a plurality of images obtained by varying conditions with respect to a three-dimensional shape model;

an evaluation unit that calculates a first evaluation value that decreases steadily as a feature point group is distributed more uniformly on the three-dimensional shape model and a second evaluation value that decreases steadily as extraction of a feature point in an image corresponding to a feature point on the three-dimensional shape model becomes easier, and calculates an evaluation value relating to a designated feature point group as a weighted sum of the respective evaluation values; and a feature point arrangement unit that arranges the feature point group on the three-dimensional shape model so that the evaluation value calculated by the evaluation means is minimized.

(Supplementary Note 2)

The feature point generation system according to Supplementary note 1, wherein the evaluation means uses, as the second evaluation value, a value calculated as a value that decreases steadily as a symmetry of a local pattern of the feature point in the image increases.

(Supplementary Note 3)

The feature point generation system according to Supplementary note 1, wherein the evaluation means calculates a third evaluation value, which is calculated as a value that decreases steadily as a similarity of a local pattern of the feature point in the image increases between the respective images obtained under different conditions, and calculates the evaluation value relating to the designated feature point group as a weighted sum of the respective evaluation values.

(Supplementary Note 4)

The feature point generation system according to Supplementary note 1, wherein the image group generation means generates images obtained by varying conditions with respect to three-dimensional shape models of a plurality of individuals, and the evaluation means calculates a fourth evaluation value that takes a steadily smaller value as feature points of the respective individuals become closer to each other when the three-dimensional shape models of the individuals are overlapped on an identical coordinate system, and calculates the evaluation value relating to the designated feature point group as a weighted sum of the respective evaluation values.

(Supplementary Note 5)

The feature point generation system according to Supplementary note 1, wherein the evaluation means varies a size of a local pattern of the feature point and calculates a second evaluation value corresponding to the size of the local pattern, and the feature point arrangement means determines both the arrangement of the feature points and the size of local patterns to be used to extract the respective feature points.

(Supplementary Note 6)

The feature point generation system according to Supplementary note 1, wherein the evaluation means calculates the second evaluation value while keeping a size of a local pattern of the feature point constant and calculates the evaluation value relating to the designated feature point group as a sum of the respective evaluation values, the feature point arrangement means moves the feature point group so that the evaluation value calculated by the evaluation means is minimized, and when the feature point group at which the evaluation value is minimized is determined, the evaluation means varies a size of a local pattern of the feature point while keeping a position of the feature point group fixed, calculates a second evaluation value corresponding to the size of the local pattern, calculates the evaluation value relating to the designated feature point group as a sum of the respective evaluation values, and determines the size of the local pattern at which the evaluation value is minimized.

(Supplementary Note 7)

The feature point generation system according to Supplementary note 6, wherein, when the size of the local pattern at which the evaluation value is minimized is determined, the evaluation means calculates the second evaluation value while keeping the size of the local pattern of the feature point fixed at the determined size, and calculates the evaluation value relating to the designated feature point group as the sum of the respective evaluation values, and the feature point arrangement means moves the feature point group so that the evaluation value calculated by the evaluation means is minimized.

(Supplementary Note 8)

The feature point generation system according to Supplementary note 1, wherein the evaluation means varies an aspect ratio of a local pattern of the feature point and calculates a second evaluation value corresponding to the aspect ratio of the local pattern, and the feature point arrangement means determines both the arrangement of the feature points and the aspect ratio of a local pattern to be used to extract respective feature points.

(Supplementary Note 9)

The feature point generation system according to Supplementary note 1, further including determination data learning means for learning determination data used for determining whether or not corresponds to a feature point from a local pattern including a feature point at which the evaluation value is minimized and a local pattern not including a feature point.

(Supplementary Note 10)

A feature point generation method including:

generating a plurality of images obtained by varying conditions with respect to a three-dimensional shape model;

calculating a first evaluation value that decreases steadily as a feature point group is distributed more uniformly on the three-dimensional shape model and a second evaluation value that decreases steadily as extraction of a feature point in an image corresponding to a feature point on the three-dimensional shape model becomes easier, and calculating an evaluation value relating to a designated feature point group as a weighted sum of the respective evaluation values; and arranging the feature point group on the three-dimensional shape model so that the evaluation value calculated by the evaluation means is minimized.

(Supplementary Note 11)

The feature point generation method according to Supplementary note 10, wherein a value calculated as a value that decreases steadily as a symmetry of a local pattern of the feature point in the image increases is used as the second evaluation value.

(Supplementary Note 12)

The feature point generation method according to Supplementary note 10, wherein a third evaluation value is calculated as a value that decreases steadily as a similarity of a local pattern of the feature point in the image increases between the respective images obtained under different conditions, and the evaluation value relating to the designated feature point group is calculated as a weighted sum of the respective evaluation values.

(Supplementary Note 13)

The feature point generation method according to Supplementary note 10, wherein images obtained by varying conditions with respect to three-dimensional shape models of a plurality of individuals are generated, and a fourth evaluation value, which takes a steadily smaller value as feature points of the respective individuals become closer to each other when the three-dimensional shape models of the individuals are overlapped on an identical coordinate system, is calculated, and the evaluation value relating to the designated feature point group is calculated as a weighted sum of the respective evaluation values.

(Supplementary Note 14)

The feature point generation method according to Supplementary note 10, wherein a size of a local pattern of the feature point is varied and a second evaluation value corresponding to the size of the local pattern is calculated, and both the arrangement of the feature points and the size of local patterns to be used to extract the respective feature points are determined.

(Supplementary Note 15)

A feature point generation program for causing a computer to execute:

image group generation processing for generating a plurality of images obtained by varying conditions with respect to a three-dimensional shape model;

evaluation processing for calculating a first evaluation value that decreases steadily as a feature point group is distributed more uniformly on the three-dimensional shape model and a second evaluation value that decreases steadily as extraction of a feature point in an image corresponding to a feature point on the three-dimensional shape model becomes easier, and calculating an evaluation value relating to a designated feature point group as a weighted sum of the respective evaluation values; and feature point arrangement processing for arranging the feature point group on the three-dimensional shape model so that the evaluation value calculated in the evaluation processing is minimized.

(Supplementary Note 16)

The feature point generation program according to Supplementary note 15, wherein the computer is caused to set, as the second evaluation value, a value calculated as a value that decreases steadily as a symmetry of a local pattern of the feature point in the image increases.

(Supplementary Note 17)

The feature point generation program according to Supplementary note 15, wherein, in the evaluation processing, the computer is caused to calculate a third evaluation value, which is calculated as a value that decreases steadily as a similarity of a local pattern of the feature point in the image increases between the respective images obtained under different conditions, and calculate the evaluation value relating to the designated feature point group as a weighted sum of the respective evaluation values.

(Supplementary Note 18)

The feature point generation program according to Supplementary note 15, wherein, in the image group generation processing, the computer is caused to generate images obtained by varying conditions with respect to three-dimensional shape models of a plurality of individuals, and in the evaluation processing, the computer is caused to calculate a fourth evaluation value that takes a steadily smaller value as feature points of the respective individuals become closer to each other when the three-dimensional shape models of the individuals are overlapped on an identical coordinate system, and calculate the evaluation value relating to the designated feature point group as a weighted sum of the respective evaluation values.

(Supplementary Note 19)

The feature point generation program according to Supplementary note 15, wherein, in the evaluation program, the computer is caused to vary a size of a local pattern of the feature point and calculate a second evaluation value corresponding to the size of the local pattern, and in the feature point arrangement processing, the computer is caused to determine both the arrangement of the feature points and the size of local patterns to be used to extract the respective feature points.

The present invention may be used favorably as a system for generating a feature point on a three-dimensional shape model used in an apparatus for performing attitude estimation and individual recognition on an individual or the like.

| | |
|---|---|
| 1 | feature point generation system |
| 2 | learning image group generation means |
| 3 | feature point arrangement means |
| 4, 4a | evaluation means |
| 21 | feature point extractor learning means |

What is claimed is:

1. A feature point generation system comprising one or more computers comprising:

an image group generation unit configured to generate a plurality of images obtained by varying conditions with respect to a three-dimensional shape model;

an evaluation unit configured to calculate a first evaluation value that decreases steadily as a feature point group is distributed more uniformly on the three-dimensional shape model and a second evaluation value that decreases steadily as an extraction ease of a feature point in an image corresponding to a feature point on the three-dimensional shape model increases, and to calculate an evaluation value relating to a designated feature point group as a weighted sum of the respective first evaluation value and the respective second evaluation value; and a feature point arrangement unit configured to arrange the feature point group on the three-dimensional shape model so that the evaluation value relating to the designated feature point group calculated by the evaluation unit is minimized.

2. The feature point generation system according to claim 1, wherein the evaluation unit is configured to use, as the second evaluation value, a value calculated as a value that decreases steadily as a symmetry of a local pattern of the feature point in the image increases.

3. The feature point generation system according to claim 1, wherein the evaluation unit is configured to calculate a third evaluation value, which is calculated as a value that decreases steadily as a similarity of a local pattern of the feature point in the image increases between the respective images obtained under different conditions, and to calculate the evaluation value relating to the designated feature point group as a weighted sum of the respective third evaluation value.

4. The feature point generation system according to claim 1, wherein the image group generation unit is configured to generate images obtained by varying conditions with respect to three-dimensional shape models of a plurality of individuals, and the evaluation unit is configured to calculate a fourth evaluation value that takes a steadily smaller value as feature points of the plurality of individuals become closer to each other when the three-dimensional shape models of the individuals are overlapped on an identical coordinate system, and to calculate the evaluation value relating to the designated feature point group as a weighted sum of the respective fourth evaluation value.

5. The feature point generation system according to claim 1, wherein the evaluation unit is configured to vary a size of a local pattern of the feature point and to calculate the second evaluation value corresponding to the size of the local pattern, and the feature point arrangement unit is configured to determine both the arrangement of the feature point group and sizes of a plurality of local patterns to be used to extract a plurality of feature points.

6. The feature point generation system according to claim 1, wherein the evaluation unit is configured to calculate the second evaluation value while keeping a size of a local pattern of the feature point constant and to calculate the evaluation value relating to the designated feature point group as a sum of the respective second evaluation value, the feature point arrangement unit is configured to move the feature point group so that the evaluation value relating to the designated feature point group calculated by the evaluation unit is minimized, and when the feature point group at which the evaluation value is minimized is determined, the evaluation unit is configured to vary a size of a local pattern of the feature point while keeping a position of the feature point group fixed, to calculate the second evaluation value corresponding to the size of the local pattern, to calculate the evaluation value relating to the designated feature point group as a sum of the respective second evaluation value, and to determine the size of the local pattern at which the evaluation value is minimized.

7. The feature point generation system according to claim 6, wherein, when the size of the local pattern at which the evaluation value is minimized is determined, the evaluation unit is configured to calculate the second evaluation value while keeping the size of the local pattern of the feature point fixed at the determined size, and to calculate the evaluation value relating to the designated feature point group as the sum of the respective second evaluation value, and the feature point arrangement unit is configured to move the feature point group so that the evaluation value relating to the designated feature point group calculated by the evaluation unit is minimized.

8. The feature point generation system according to claim 1, wherein the evaluation unit is configured to vary an aspect ratio of a local pattern of the feature point and to calculate the second evaluation value corresponding to the aspect ratio of the local pattern, and the feature point arrangement unit is configured to determine both the arrangement of the feature point group and the aspect ratio of a local pattern to be used to extract respective feature points.

9. The feature point generation system according to claim 1, further comprising a determination data learning unit configured to learn determination data used for determining whether or not the point in the image corresponds to a feature point from a local pattern including a feature point at which the evaluation value is minimized and a local pattern not including a feature point.

10. A feature point generation method comprising:

generating a plurality of images obtained by varying conditions with respect to a three-dimensional shape model;

calculating a first evaluation value that decreases steadily as a feature point group is distributed more uniformly on the three-dimensional shape model and a second evaluation value that decreases steadily as an extraction ease of a feature point in an image corresponding to a feature point on the three-dimensional shape model increases, and calculating an evaluation value relating to a designated feature point group as a weighted sum of the respective first evaluation value and the respective second evaluation value; and arranging the feature point group on the three-dimensional shape model so that the evaluation value relating to the designated feature point group is minimized.

11. The feature point generation method according to claim 10, wherein a value calculated as a value that decreases steadily as a symmetry of a local pattern of the feature point in the image increases is used as the second evaluation value.

12. The feature point generation method according to claim 10, wherein a third evaluation value is calculated as a value that decreases steadily as a similarity of a local pattern of the feature point in the image increases between the respective images obtained under different conditions, and the evaluation value relating to the designated feature point group is calculated as a weighted sum of the respective third evaluation value.

13. The feature point generation method according to claim 10, wherein images obtained by varying conditions with respect to three-dimensional shape models of a plurality of individuals are generated, and a fourth evaluation value, which takes a steadily smaller value as feature points of the plurality of individuals become closer to each other when the three-dimensional shape models of the individuals are overlapped on an identical coordinate system, is calculated, and the evaluation value relating to the designated feature point group is calculated as a weighted sum of the respective fourth evaluation value.

14. The feature point generation method according to claim 10, wherein a size of a local pattern of the feature point is varied and the second evaluation value corresponding to the size of the local pattern is calculated, and both the arrangement of the feature point group and sizes of a plurality of local patterns to be used to extract a plurality of feature points are determined.

* * * * *